US007350766B2

United States Patent
Comstock et al.

(10) Patent No.: US 7,350,766 B2
(45) Date of Patent: Apr. 1, 2008

(54) KNIFE GATE VALVE WITH MULTI-PIECE ELASTOMER LINER AND/OR O-RINGS AT FLANGE INTERFACE

(76) Inventors: John Paul Comstock, 217 Oakdale Dr., Amory, MS (US) 38821; Jody W. Powell, 210 Easthaven Dr., Amory, MS (US) 38821

( * ) Notice: Subject to any disclaimer, the term of this patent is extended or adjusted under 35 U.S.C. 154(b) by 54 days.

(21) Appl. No.: 11/129,633

(22) Filed: May 13, 2005

(65) Prior Publication Data
US 2006/0255305 A1 Nov. 16, 2006

(51) Int. Cl.
*F16K 3/00* (2006.01)
(52) U.S. Cl. ...................................................... 251/328
(58) Field of Classification Search ................ 251/326, 251/327, 328, 175, 193
See application file for complete search history.

(56) References Cited

U.S. PATENT DOCUMENTS

| | | | |
|---|---|---|---|
| 3,367,625 A * | 2/1968 | Fortune | 251/327 |
| 3,917,223 A | 11/1975 | Sidler et al. | |
| 3,937,442 A | 2/1976 | Martin et al. | |
| 3,993,092 A | 11/1976 | Still | |
| 4,009,727 A | 3/1977 | Bailey | |
| 4,377,274 A | 3/1983 | Mayhew, Jr. | |
| 4,603,864 A * | 8/1986 | Raftis | 251/328 |
| 4,773,627 A | 9/1988 | King et al. | |
| 4,776,564 A * | 10/1988 | Westenberg | 251/172 |
| 4,881,719 A | 11/1989 | Bowman et al. | |
| 5,014,730 A | 5/1991 | Fye | |
| 5,020,776 A | 6/1991 | Owens et al. | |
| 5,082,247 A | 1/1992 | Owens et al. | |
| 5,271,426 A | 12/1993 | Clarkson et al. | |
| 5,330,158 A * | 7/1994 | Ellich et al. | 250/327 |
| 5,338,006 A | 8/1994 | McCutcheon et al. | |
| 5,464,035 A * | 11/1995 | Heinecke | 137/312 |
| 5,549,278 A * | 8/1996 | Sidler | 251/328 |

(Continued)

FOREIGN PATENT DOCUMENTS

DE 25 06 140 A1 8/1976

(Continued)

OTHER PUBLICATIONS

Tyco Flow Control L&M Valve Brochure; Tyco Valves & Controls; 2003; 4 pp.

*Primary Examiner*—John Rivell
*Assistant Examiner*—Cloud Lee
(74) *Attorney, Agent, or Firm*—RatnerPrestia

(57) ABSTRACT

A knife gate valve comprising a two-piece valve body, a knife gate, an elastomeric transverse seal, an elastomeric perimeter seal, and a pair of elastomer liners. Each elastomer liner is positioned between the knife gate and one of the mating valve body halves and defines a chamber for receiving the perimeter seal. Each liner has a port that corresponds to the flow channel, a sealing portion that extends into a sealing chamber to cooperate with the transverse seal, and an orifice liner extension that lines the orifice of the corresponding valve body half. O-rings, preferably of a softer material than the elastomer liner, may be positioned on the outer rim of the orifice liner extensions for creating a seal among the elastomer liner, the corresponding valve body half, and a corresponding mating flange of a fluid handling system.

24 Claims, 5 Drawing Sheets

U.S. PATENT DOCUMENTS

| | | |
|---|---|---|
| 5,560,587 A | 10/1996 | McCutcheon et al. |
| 5,938,175 A | 8/1999 | Young et al. |
| 6,010,115 A | 1/2000 | Schlegel et al. |
| 6,375,157 B1 * | 4/2002 | Van de Lande ............. 251/327 |
| 6,422,535 B1 * | 7/2002 | Stone et al. ................. 251/327 |
| 6,588,729 B1 * | 7/2003 | Kimpel ....................... 251/328 |
| 6,745,999 B1 | 6/2004 | Heinecke et al. |
| 7,100,893 B2 * | 9/2006 | Williams et al. ............ 251/328 |
| 2003/0062502 A1 * | 4/2003 | Knobbe et al. ............. 251/326 |
| 2004/0217319 A1 | 11/2004 | Reeves et al. |

FOREIGN PATENT DOCUMENTS

EP    0 943 850 A    9/1999

* cited by examiner

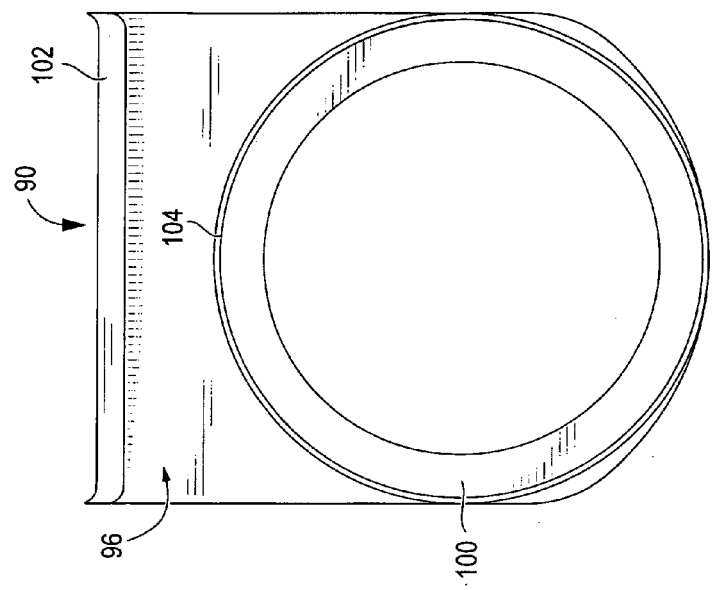
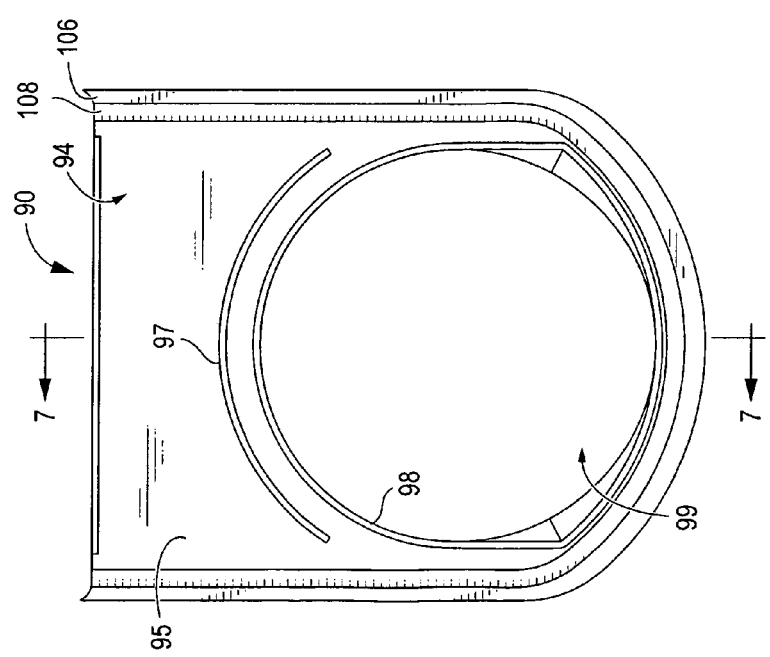
FIG. 2B
FIG. 2A

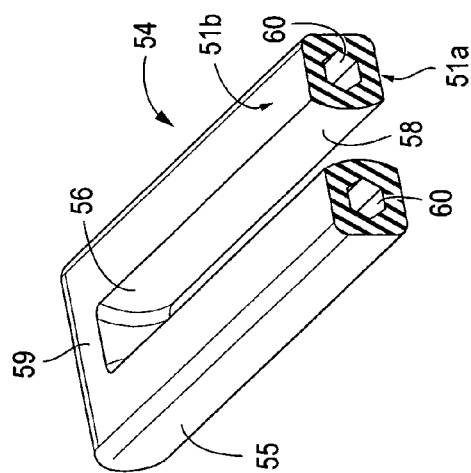
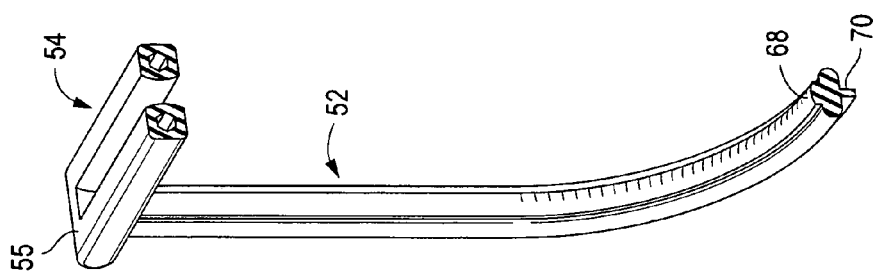
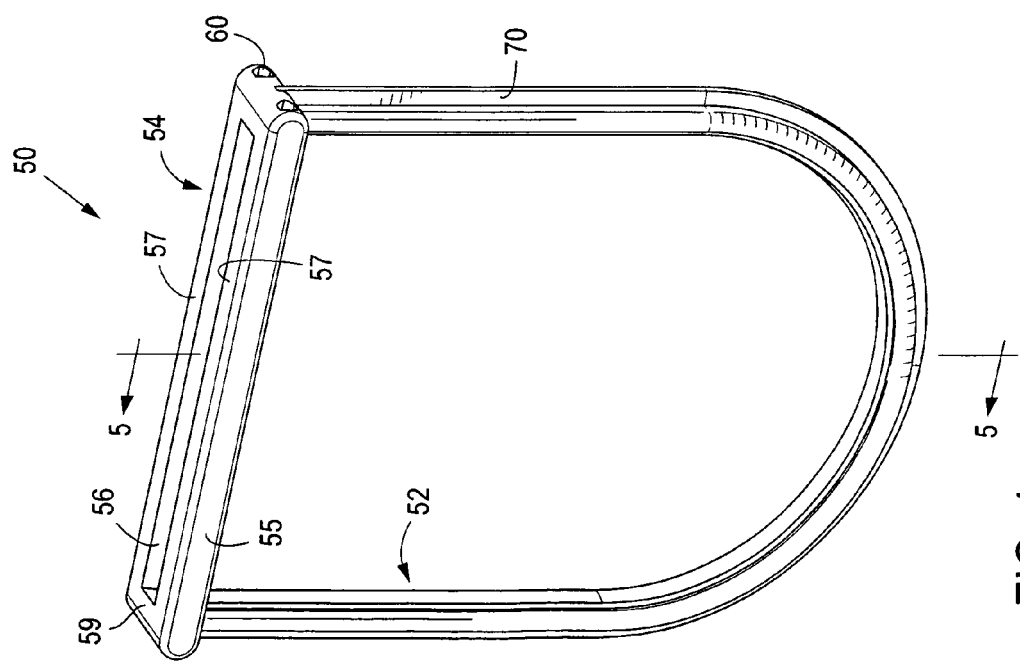

KNIFE GATE VALVE WITH MULTI-PIECE ELASTOMER LINER AND/OR O-RINGS AT FLANGE INTERFACE

FIELD OF THE INVENTION

This invention relates to valves, more particularly knife gate valves.

BACKGROUND OF THE INVENTION

Knife gate valves are well known in the art for use in a variety of applications in a broad range of industries, including but not limited to, pulp & paper, chemical, petroleum refining, mining, iron and steel manufacture, waste water, power generation, food and beverage, and marine applications. In particular, knife gate valves are advantageous for use in non-abrasive and abrasive slurry applications and for large diameter water applications. The use of elastomeric valve seats are known to be particularly helpful for applications having high solids or prone to scaling.

One advantage of knife gate valves is the ability to cut through slurries, scale, and surface build ups. Another advantage is the unobstructed flow path, which not only provides high flow capacity, but also allows large objects to safely pass through the valve. Small face-to-face dimensions reduce the weight of the valve and facilitate piping design. Knife gate valves are typically available in sizes as small as 2" diameter to specially fabricated valves exceeding 100" in diameter.

Disadvantages of knife gate valves historically have been a general inability to provide a tight shut off and the presence of cavities within the valve that promote contamination of the fluid stream. The use of elastomeric transverse seals has increased the ability of knife gate valves to provide a tighter shut off. In particular, U.S. Pat. Ser. No. 10/816,520, incorporated herein by reference, owned by the common assignee of the present invention, and listing as a Co-inventor Paul Comstock, who is also a listed inventor of the present invention, discloses a combined transverse seal/perimeter seal in which the transverse seal is adapted to receive an injectable packing material, which provides an improved seal.

Because slurries can be abrasive and sometimes corrosive, knife gate valves used in such service may have a liner to protect the valve body. Some valves have internally bonded liners, whereas others use a single-piece or multi-piece replaceable liner clamped between two separate body halves. In designs in which the liner material extends to the mating flanges between which the valve is mounted, the liner material may create the seal between the valve and the mating flanges. If the face of the liner that contacts the mating flanges becomes damaged, however, and the seal is compromised, overtightening the flanges to reduce leaking at the flange may compress the liner against the gate. This compression of the liner against the gate can increase actuation forces for the gate and may lead to premature failure of the liner. Thus, there is always a need in the art to improve durability and seal quality of lined gate valves.

SUMMARY OF THE INVENTION

One aspect of the invention comprises a knife gate valve comprising a valve body with mating halves each comprising an orifice, the orifices in an assembled configuration of the mating halves defining a flow channel extending through the body and a sealing chamber that extends in a first direction normal to the flow channel. A knife gate is positioned to slide within a gate channel between the halves of the valve body between (a) a closed position in which the knife gate blocks flow through the flow channel and (b) one or more open positions in which the knife gate has been at least partially retracted in a first direction so that it permits flow through the flow channel. The valve comprises an elastomeric transverse seal, an elastomeric perimeter seal, and a pair of elastomer liners. The transverse seal is mounted in the sealing chamber and comprises a body member having a peripherally enclosed knife gate slot for receiving the knife gate. The perimeter seal comprises an inner surface and an outer surface, the inner surface comprising a sealing surface that lines the gate channel for creating a peripheral seal with the knife gate. Each elastomer liner is positioned between the knife gate and one of the mating valve body halves and defines a chamber for receiving the perimeter seal. Each liner has a port that corresponds to the flow channel and a sealing portion that extends into the sealing chamber to cooperate with the transverse seal. Each liner also has an inner face and an outward face comprising an orifice liner extension that lines the orifice of the corresponding valve body half.

Each liner extension may have an outer rim, the valve further comprising a pair of o-rings, each o-ring positioned on the outer rim of one of the elastomer liner extensions for creating a seal among the elastomer liner, the corresponding valve body half, and the corresponding mating flange of the fluid handling system. The o-ring may comprise an elastomer material that is softer than the elastomer liners, which may comprise urethane. The inner face of the sealing portion of each elastomer liner may be substantially flat, and may comprise an integral, protruding wiping element, such as in the shape of an arc across a width of the liner inner face, in contact with the knife gate.

Another aspect of the invention comprises a knife gate valve for installation between mating flanges in a fluid handling system, the valve comprising a valve body and a knife gate as described above, and one or more elastomer liner/seal members mounted in the sealing chamber and extending around the periphery of the knife gate between the knife gate and the mating valve body halves and having orifice liner extensions that line the orifices of the valve body halves, each orifice liner extension having an outer rim. A pair of o-rings, each o-ring positioned on the outer rim of one of the orifice liner extensions, is adapted to create a seal among the elastomer liner, the corresponding valve body half, and the corresponding mating flange of the fluid handling system.

The knife gate may have one or all of the above-mentioned features, and in one embodiment may comprise all of the aforementioned features, in addition to an integral elastomeric transverse seal/perimeter seal member in which the transverse seal comprises a body member having a peripherally enclosed knife gate slot for receiving the knife gate, expandable sealing surfaces on upstream and downstream sides of the knife gate slot for creating a seal with the knife gate, and one or more injection chambers adapted to receive an injectable packing, each chamber having a cross-sectional area that is completely surrounded by the body member. In this embodiment, the perimeter seal also comprises an integral gasket protruding from its outer surface that is positioned between the elastomer liners.

BRIEF DESCRIPTION OF THE DRAWINGS

FIG. 2A is a plan view of the inner surface of an exemplary liner member.

FIG. 2B is a plan view of the outer surface of the liner member of FIG. 2A.

FIG. 4 is a perspective view of an integral perimeter seal/transverse seal embodiment.

FIG. 5 is a cutaway view of the integral seal of FIG. 4, showing the cross-sectional geometry of both the perimeter seal and transverse seal portions.

FIG. 6 is a cutaway view of an exemplary transverse seal embodiment.

DETAILED DESCRIPTION OF THE INVENTION

Figure 1B:
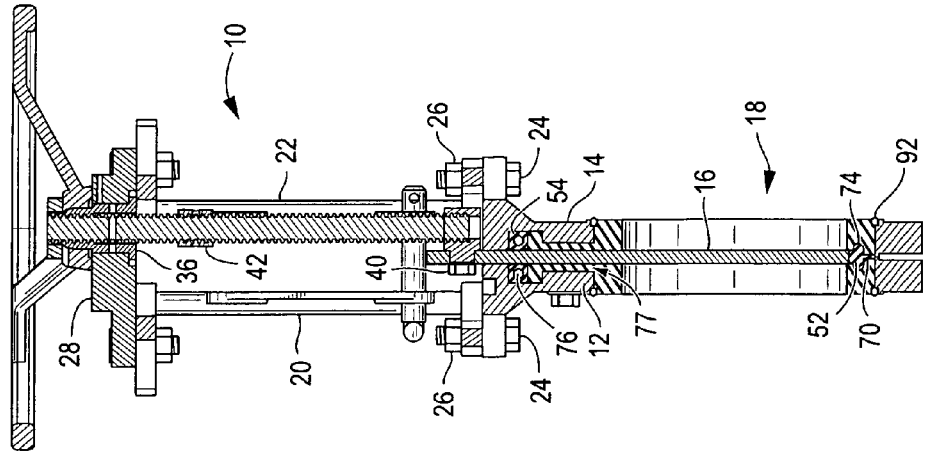
FIG. 1B is a cross-sectional view of the valve of FIG. 1A, taken across line 1A-1A.
Figure 1A:
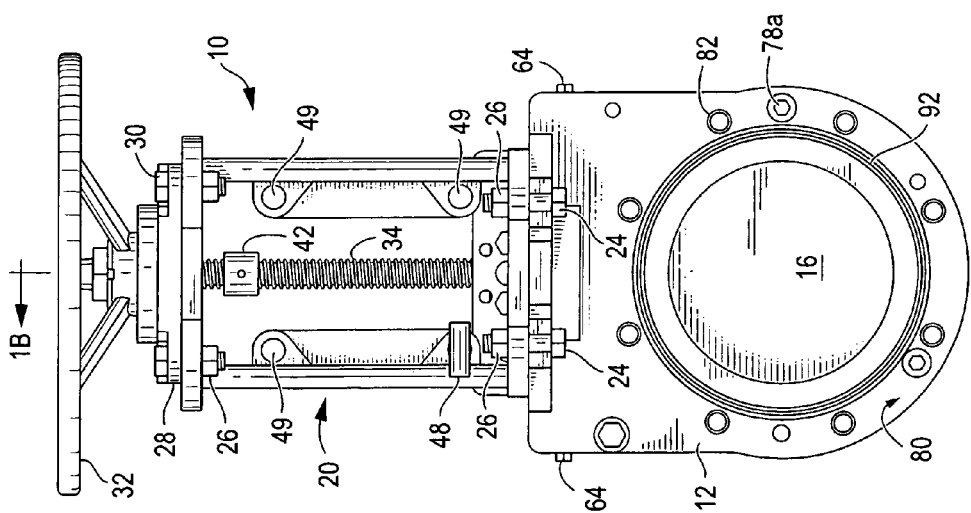
FIG. 1A is a plan view of an exemplary valve embodiment of the present invention.

The invention will next be described with respect to the figures. FIGS. 1-7 depict an exemplary knife gate valve embodiment 10 of the present invention. Valve 10 comprises two body halves 12 and 14 that define a gate channel through which gate 16 slides to open or close pathway 18 through the orifices 13 in the valve body. Mounted on top of the body halves 12 and 14 are yoke halves 20 and 22. The body halves are typically connected to the yoke halves with yoke hold down bolts 24 and fasteners 26. A yoke hub 28, connected to the yoke halves with hub hold down bolts 30 and fasteners 26, sits atop the yoke halves and provides a platform for hand wheel 32. The invention is not limited to hand wheel actuators, however, as removal of the hub allows the use of other types of actuators, such as but not limited to pneumatic, hydraulic, electric or bevel gear actuators.

Handwheel 32 turns drive nut assembly 36, which turns the threaded stem 34. Wave spring 44, retaining washer 45, and retaining nut 46 fix the drive nut assembly 36 to the handwheel 32. Wave spring 44 keeps the handwheel in tension and prevents it from shaking off in high vibration applications. At the end of stem 34 is stemnut 38 which is attached to gate 16 with stemnut bolts 40. As the threaded stem 34 turns the stemnut 38 either travels up or down along the axis of the stem 34. Travel stop 42 limits the upward travel of stemnut 38. A lockout pin 48 is provided for insertion in any of lockout holes 49 in the yoke and/or gate to mechanically prevent the valve from being opened or closed (depending upon the location of the gate when pinned) pursuant to common industry safety procedures. Additional components, not shown or shown but not discussed, may also be present. The above elements are typical features of knife gate valves generally, and are not unique or critical to the present invention. Accordingly, the invention is not limited to valves having any particular components except those specifically recited in the claims.

Figure 3:
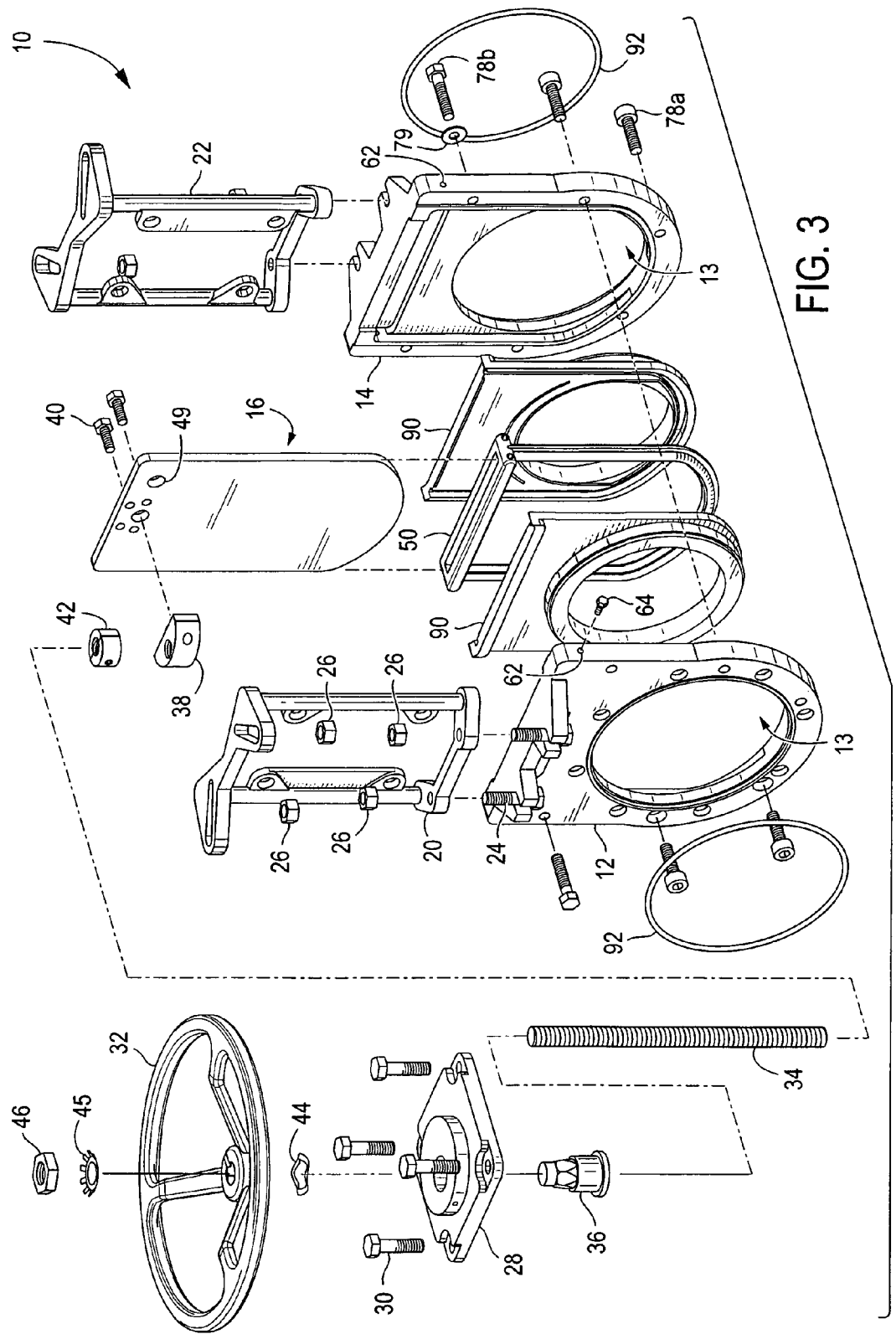
FIG. 3 is an exploded perspective view of the valve of FIG. 1.

As shown in FIG. 3 and in more detail in FIGS. 2A, 2B and 4-7, the exemplary knife gate valve 10 of the present invention further comprises an integral, single-piece perimeter and transverse seal 50, a pair of elastomer liners 90, and o-rings 92.

Figure 7:
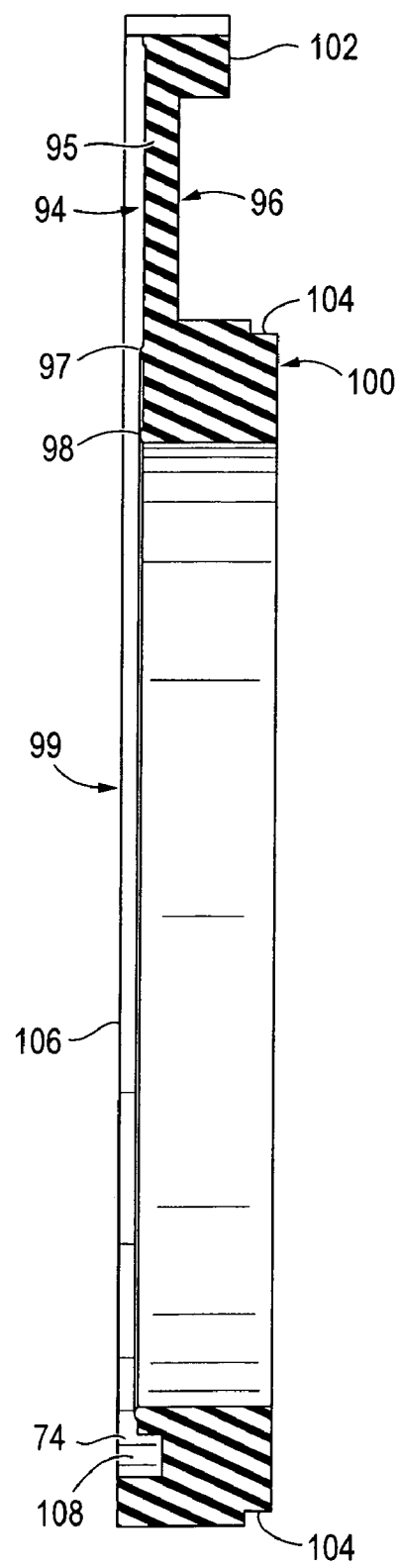
FIG. 7 is a cross-sectional view of the liner member of FIG. 2A, taken across line 7-7.

Elastomer liners 90, as shown in plan view in FIGS. 2A and 2B and in cross section in FIG. 7, each have an inner face 94 and an outer face 96. Inner face 94 is the face adjacent gate 16 and comprises a substantially flat portion 95 having a protruding wiper 97 as well as a protruding outline 98 about port 99. When the liner is inserted in the valve in contact with the gate, protruding features 97 and 98 create regions in which the compressive force of the elastomer liner against the gate is stronger than throughout the rest of the liner, thus creating a good seal. Wiper 97 is shown in the shape of an arc spaced equidistantly from the arc of the port outline 98 across the width of the inner face. The invention is not limited to elastomer liners with a particular wiper or port outline geometry, however, or even to embodiments with protruding wipers or port outlines at all. Each inner face 90 also comprises an extended rim 106 and groove 108 such that when the liners are held together inner face to inner face between the body halves they define a perimeter seal chamber 74 to retain the perimeter seal in the desired position. The valve body and elastomer liners cooperate to form a transverse seal chamber 76 to retain the transverse seal 54 in the desired position.

Outer face 96 of elastomer liner 90 comprises an orifice liner extension 100 that lines orifice 13 of valve body 12 or 14. Outer face 96 also comprises an upper ledge 102 which abuts the underside of the transverse seal 54 in the assembled configuration as shown in FIG. 2. Orifice liner extension comprises an indentation 104 on its outer rim for receiving o-ring 92.

Although the combination perimeter seal/transverse seal 50 is shown and described in detail in U.S. Pat. Ser. No. 10/816,520, incorporated by reference, portions of that disclosure are repeated here. It should be noted that in the '520 application, the term "gate seal" refers to the unit or portion referred to as the "perimeter seal" in this application, and the term "chest seal" refers to the unit or portion referred to as the "transverse seal" in this application. Although shown as an integral, single piece unit 50 in FIGS. 3-5, perimeter seal 52 may be a separate component from transverse seal 54. Transverse seal 54 shown in FIG. 6 is shown as a standalone unit, but is otherwise similar to the transverse seal portion 54 of integral perimeter and transverse seal 50.

Transverse seal 54, whether a standalone unit as shown in FIG. 6 or as a portion of an integral perimeter and transverse seal, comprises an elastomeric body member 55 having a knife gate slot 56 for receiving knife gate 16. Expandable sealing surfaces 58 of gate slot 56 have a convex geometry, such as a rounded geometry with a single continuous arc from the lower plane 51a to the upper plane 51b of the transverse seal member as shown in FIG. 6. Other convex geometries may also be provided, however, including multiple arcs or ridges. Transverse seal 54 has one or more inner channels 60 for receiving injectable packing, preferably one channel on each of the upstream and downstream sides 57 of the knife gate slot. The packing may be injected into the seal through seal injection ports 62 in the body halves 12 and 14 that are aligned with channels 60 when the valve is assembled. Plugs 64, typically bolts that mate with threads in the body halves, close seal injection ports 62 after the packing has been injected. As the plugs 64 are advanced into the injection ports, the injectable packing expands the expandable sealing surfaces 58 of the transverse seal and causes expandable sealing surfaces 58 to make a tighter seal with the gate.

Suitable injectable packing comprises any injectable packing materials known in the art. Such materials are typically tacky, fibrous, flowable materials, such as a blend of lubricants and fibers, as is described generally in U.S. Pat. No. 4,162,078, incorporated herein by reference, and as manufactured, for example, by Utex Industries, Inc. of Houston Tex. under the trademark U-PAK®, by O.G. Supply, Inc. of Corona, Calif., under the trademark SEALITAL®, or by Deacon Industries of Washington, Pa. One injectable packing particularly well-suited to this application is known in the trade as DEACON™ 5500A. These are merely examples of the numerous such products that are well known in the art, however, and the invention is not limited to the use of any particular type of injectable packing.

Because inner channels 60 are completely contained within the elastomeric body of transverse seal 54, the injectable packing cannot leak into the flow stream. Transverse seal 54 as shown in the figures comprises a single elastomeric member 55 that completely surrounds the rectangular knife gate slot, the single member comprising two long side portions 57 and two short side portions 59 connecting the long side portions. In some applications, however, it may be desirable to provide discrete transverse seal components in the shape of long side portions 57, with no connection between these individual components. Although such a construction does not have the advantage of completely surrounding the knife gate slot to maximize the overall sealing surface, this embodiment still retains the advantage over the prior art of providing a completely contained injection chamber for receiving the injectable packing, so that the packing does not leak into the fluid stream.

In yet another embodiment, in addition to discrete long side portions 57 on the upstream and downstream sides of the rectangular knife gate, additional discrete short side portions 59 may be provided perpendicular to the upstream and downstream sides to completely line the cross sectional periphery of knife gate 16 in the same way as single member 55 as shown in the figures, but using a plurality of discrete components rather than an integral construction. Thus, unless specifically indicated, references to the transverse seal of this invention refers to both the single integral member or to a plurality of discrete members.

Although shown in the figures with injectable packing chambers only on the long side portions 57, additional injectable packing chambers (not shown) may be provided in the short side portions 59, with suitable access ports in the body of the valve to fill the chambers. Thus, short side portions 59, whether discrete components or integral portions of member 55, may be provided with or without injectable packing chambers.

Perimeter seal 52, whether a portion of integral perimeter and transverse seal 50 or a stand alone component (not shown), comprises a sealing surface 68 that creates a seal with gate 16, and an integral gasket 70 that forms a gasket between elastomer liners 90, as best shown in FIG. 1B.

After positioning the liners and seals in the desired locations as shown in FIG. 3, in which body halves 12 and 14 together create a sealing chamber 77 for receiving the transverse seal 54 and the flat portions 95 of the elastomer liners 90, the body halves are connected together with body clamping bolts 78a and 78b. As shown in FIG. 3, body clamping bolts 78a used on connection face 80—the portion that connects with the mating pipe flanges (not shown) of the pipeline in which the valve is installed—typically have socket heads to enable them to be tightened into recesses in the body so that they do not protrude from the connection face. Body clamping bolts 78b not on the connection face where protrusion is not an issue may have cap heads and may further utilize washers 79. It should be noted, however, that the invention is not limited to any particular types of nuts and bolts. Bolt holes 82 in the body are provided for installation of the valve between mating pipe flanges.

The various components of the valve may comprise any materials known in the art. Typically the body, yoke, and other structural components are metallic, such as stainless steel, carbon steel, plated steel, and the like. Certain components, such as the drive nut and stem nut, may be fabricated of bronze. Because precise tolerances are not required for the hand wheel, it may be cast iron. The perimeter seal and transverse seal may comprise any elastomeric material, such as a natural or synthetic rubber, including but not limited to materials such as EPDM (Ethylene Propylene Diene Monomer), VITON® fluoroelastomer (produced by E.I. duPont de Nemours and Company, of Wilmington, Del.) or AFLAS® fluoroelastomer (produced the Asahi Glass Company, Inc. of Japan).

Elastomer liners 90 preferably comprise urethane, but may also comprise any elastomer known in the art, including any of the materials mentioned above. The two-piece elastomer liner provides ease of maintenance by allowing replacement of only one side of the worn liner (typically the downstream side), rather than both sides at the same time. The elastomer transverse seal, particularly when adapted to receive injectable packing, provides a tight seal across the gate with little adjustment effort required to maintain the seal, and is superior to pre-existing braided packing seal arrangements that are often prone to leaks and frequent adjustment. The replaceable o-rings 92 are preferably constructed of a material that is softer than the elastomer liners. In particularly desirable embodiments, the elastomer liners comprise urethane, the o-rings comprise Nitrile or EPDM, and the perimeter/transverse seal comprises EPDM, Viton or Aflas. The softer o-ring creates a more effective seal with the mating flange and absorbs more of the compressive forces from tightening the flanges than a relatively harder material, such as a urethane liner without o-rings, which would tend to transmit greater compressive forces into increased frictional engagement with the gate, potentially leading to premature failure of the liner.

Thus, the combination of elements as described herein offers excellent abrasion and corrosion resistance, superior seals between the gate and the body and between the valve and mating flanges, and easy maintenance. Although shown in a single embodiment that includes a plurality of desirable features, embodiments comprising fewer than all of these features may also be constructed, including any combination of the elements described herein. Accordingly, the invention is not limited only to the embodiment shown. Although ideal for use in slurry service, it should be understood that valves having the features described and claimed herein may be used in any kind of fluid handling service, where the term "fluid" is interpreted broadly, to include gas, liquid, solids, or any combination thereof.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A knife gate valve comprising:
    a valve body comprising mating halves each comprising an orifice, the orifices in an assembled configuration of the mating halves defining a flow channel extending through the body and a sealing chamber that extends in a first direction normal to the flow channel;

a knife gate positioned to slide within a gate channel between the halves of the valve body between (a) a closed position in which the knife gate blocks flow through the flow channel and (b) one or more open positions in which the knife gate has been at least partially retracted in the first direction so that it permits flow through the flow channel;

an elastomeric transverse seal mounted in the sealing chamber, the transverse seal comprising a body member having a peripherally enclosed knife gate slot for receiving the knife gate;

a elastomeric perimeter seal comprising an inner surface and an outer surface, the inner surface comprising a sealing surface that lines the gate channel for creating a peripheral seal with the knife gate; and a pair of discrete elastomer liners, each liner positioned between the knife gate and one of the mating valve body halves and defining a chamber for receiving the perimeter seal, each liner having a port that corresponds to the flow channel and a sealing portion that extends into the sealing chamber to cooperate with the transverse seal, each liner having an inner face and an outward face comprising an orifice liner extension that lines the orifice of the corresponding valve body half, wherein the discrete elastomer liners are unattached to the perimeter seal.

2. The knife gate valve of claim 1, wherein the valve is for installation between mating flanges in a fluid handling system, each liner extension having an outer rim, the valve further comprising a pair of o-rings, each o-ring positioned on the outer rim of one of the elastomer liner extensions for creating a seal among the elastomer liner, the corresponding valve body half, and the corresponding mating flange of the fluid handling system.

3. The knife gate valve of claim 2, wherein the o-ring comprises an elastomer material that is softer than the elastomer liners.

4. The knife gate valve of claim 1, wherein the perimeter seal and the transverse seal together comprise a single piece element.

5. The knife gate valve of claim 1, wherein the perimeter seal has an inner face for contact with the knife gate and an outer face, the outer face comprising a integral gasket that extends radially outward from the outer face.

6. The knife gate valve of claim 1, wherein the inner face of the sealing portion of each elastomer liner comprises a substantially flat portion.

7. The knife gate valve of claim 6, wherein the substantially flat portion of the inner face of the elastomer liner comprises an integral, protruding wiping element for contact with the knife gate.

8. The knife gate valve of claim 7, wherein the wiping member is in the shape of an arc across a width of the liner inner face.

9. The knife gate valve of claim 1, wherein the elastomer liner comprises urethane.

10. The knife gate valve of claim 1, wherein the transverse seal comprises at least one body member having an expandable sealing surface for creating a seal with the knife gate and at least one injection chamber for receiving an injectable packing, the chamber having a cross-sectional area that is completely surrounded by the body member.

11. The knife gate valve of claim 10, wherein the transverse seal comprises expandable sealing surfaces on both an upstream side and a downstream side of the knife gate.

12. A knife gate valve for installation between mating flanges in a fluid handling system, the valve comprising:

a valve body comprising mating halves each comprising an orifice, the orifices in an assembled configuration of the mating halves defining a flow channel extending through the body and a sealing chamber that extends in a first direction normal to the flow channel;

a knife gate positioned to slide within a gate channel between the halves of the valve body between (a) a closed position in which the knife gate blocks flow through the flow channel and (b) one or more open positions in which the knife gate has been at least partially retracted in a first direction such that it permits flow through the flow channel;

one or more elastomer liner/seal members mounted in the sealing chamber and extending around the periphery of the knife gate between the knife gate and the mating valve body halves and having orifice liner extensions that line the orifices of the valve body halves, each orifice liner extension having an outer rim; and a pair of discrete o-rings, each o-ring positioned on the outer rim of one of the orifice liner extensions for creating a seal among the elastomer liner, the corresponding valve body half, and the corresponding mating flange of the fluid handling system, wherein each o-ring is unattached to the elastomer liner.

13. The knife gate valve of claim 12, wherein the o-ring comprises an elastomer that is softer than the elastomer of the liner.

14. The knife gate valve of claim 12, wherein the elastomer liner comprises multiple pieces, including a perimeter seal, a transverse seal, and a pair of valve body liners.

15. The knife gate valve of claim 14, wherein the perimeter seal and the transverse seal together comprise a single piece element.

16. The knife gate valve of claim 14, wherein the perimeter seal has an inner face for contact with the knife gate and an outer face, the outer face comprising a integral gasket that extends radially outward from the outer face.

17. The knife gate valve of claim 16, wherein the inner face of the sealing portion of each elastomer liner comprises a substantially flat portion.

18. The knife gate valve of claim 17, wherein the substantially flat inner face of the elastomer liner sealing portion comprises an integral, protruding wiping element in contact with the knife gate.

19. The knife gate valve of claim 18, wherein the wiping member is in the shape of an arc across a width of the liner inner face.

20. The knife gate valve of claim 14, wherein the transverse seal comprises at least one body member having an expandable sealing surface for creating a seal with the knife gate and at least one injection chamber for receiving an injectable packing, the chamber having a cross-sectional area that is completely surrounded by the body member.

21. The knife gate valve of claim 20, wherein the transverse seal comprises expandable sealing surfaces on both an upstream side and a downstream side of the knife gate.

22. The knife gate valve of claim 12, wherein the elastomer liner comprises urethane.

23. Amended) A knife gate valve for installation between mating flanges in a fluid handling system, the valve comprising:

a valve body comprising mating halves each comprising an orifice, the orifices in an assembled configuration of the mating halves defining a flow channel extending through the body and a sealing chamber that extends in a first direction normal to the flow channel;

a knife gate positioned to slide within a gate channel between the halves of the valve body between (a) a closed position in which the knife gate blocks flow through the flow channel and (b) one or more open positions in which the knife gate has been at least partially retracted in a first direction such that it permits flow through the flow channel;

an integral elastomeric transverse seal/perimeter seal member comprising a transverse seal mounted in the sealing chamber, the transverse seal comprising a body member having a peripherally enclosed knife gate slot for receiving the knife gate, expandable sealing surfaces on upstream and downstream sides of the knife gate slot for creating a seal with the knife gate, and one or more injection chambers adapted to receive an injectable packing, each chamber having a cross-sectional area that is completely surrounded by the body member, the perimeter seal comprising an inner surface and an outer surface, the inner surface comprising a sealing surface that lines the gate channel for creating a peripheral seal with the knife gate, the outer surface comprising an integral gasket protruding from the outer surface;

a pair of discrete elastomer liners, each liner positioned between the knife gate and one of the mating valve body halves and defining a perimeter seal chamber for receiving the perimeter seal mounted with the integral gasket positioned between the liners, each liner having a port that corresponds to the flow channel and a portion that extends into the sealing chamber to cooperate with the transverse seal, each liner having an inner face with a substantially flat portion having an arced protrusion for wiping the knife gate, and an outward face comprising an orifice liner extension that lines the orifice of the corresponding valve body half, each orifice liner extension having an outer rim, wherein the discrete elastomer liners are unattached to the perimeter seal;

a pair of o-rings, each o-ring positioned on the outer rim of one of the elastomer liner extensions for creating a seal among the elastomer liner, the corresponding valve body half, and the corresponding mating flange of the fluid handling system, the o-ring comprising a material of construction that is softer than the elastomer liners.

24. The knife gate valve of claim 23, wherein the elastomer liner comprises urethane.

* * * * *